United States Patent
Roch et al.

[11] Patent Number: 6,055,866
[45] Date of Patent: May 2, 2000

[54] PROCESS AND DEVICE FOR CHECKING THE SOLIDITY OF VERTICALLY ANCHORED MASTS

[76] Inventors: Mathias Roch, Staunsfeld 13, D-23923 Herrnburg; Oliver Roch, Hohenhorst-Nord 6, D-23623 Ahrensbök, both of Germany

[21] Appl. No.: 09/125,439
[22] PCT Filed: Apr. 16, 1997
[86] PCT No.: PCT/DE97/00773
§ 371 Date: Feb. 16, 1999
§ 102(e) Date: Feb. 16, 1999
[87] PCT Pub. No.: WO97/40355
PCT Pub. Date: Oct. 30, 1997

[30] Foreign Application Priority Data

Apr. 18, 1996 [DE] Germany ............ 296 07 045 U

[51] Int. Cl.[7] ............................................. G01N 3/00
[52] U.S. Cl. ............................................. 73/796; 73/786
[58] Field of Search ............................. 73/813, 818, 826, 73/831, 849, 852, 786, 796

[56] References Cited

U.S. PATENT DOCUMENTS

| | | |
|---|---|---|
| 4,343,179 | 8/1982 | Astrom et al. ............ 73/81 |
| 4,350,044 | 9/1982 | Richardson et al. ............ 73/600 |
| 4,926,691 | 5/1990 | Franklin et al. ............ 73/579 |
| 5,212,654 | 5/1993 | Deuar ............ 364/508 |

FOREIGN PATENT DOCUMENTS

| | | |
|---|---|---|
| 0638794 | 8/1994 | European Pat. Off. . |
| 9404664 | 1/1994 | Germany . |

*Primary Examiner*—Max Noori
*Attorney, Agent, or Firm*—Jacox, Meckstroth & Jenkins

[57] ABSTRACT

A method and apparatus or device are shown for checking the solidity of vertically anchored masts increasing tensile and compression forces which can be acquired with a force sensor are introduced into the mast above its anchoring, in order to load the mast with bending moments aligned oppositely to one another. With at least one distance sensor which can be brought to bear against the mast above the mast anchoring a lateral deflection of the mast which occurs on account of the bending moments is measured. The readings for the force F and the deflection S produced by the force and distance sensors are processed in an evaluation unit with respect to the functions f=F(S) and f=S(F), this being separately according to the courses of the functions f1 for the compression loading case f2 for the tensile loading case. A deviation of the gradient of the course of the function f1 from the gradient of the course of the function f2 or from the respective reference values, which is determined with the elastic deformation of the mast, is evaluated as a criterion for a fracture formation in the mast.

14 Claims, 4 Drawing Sheets

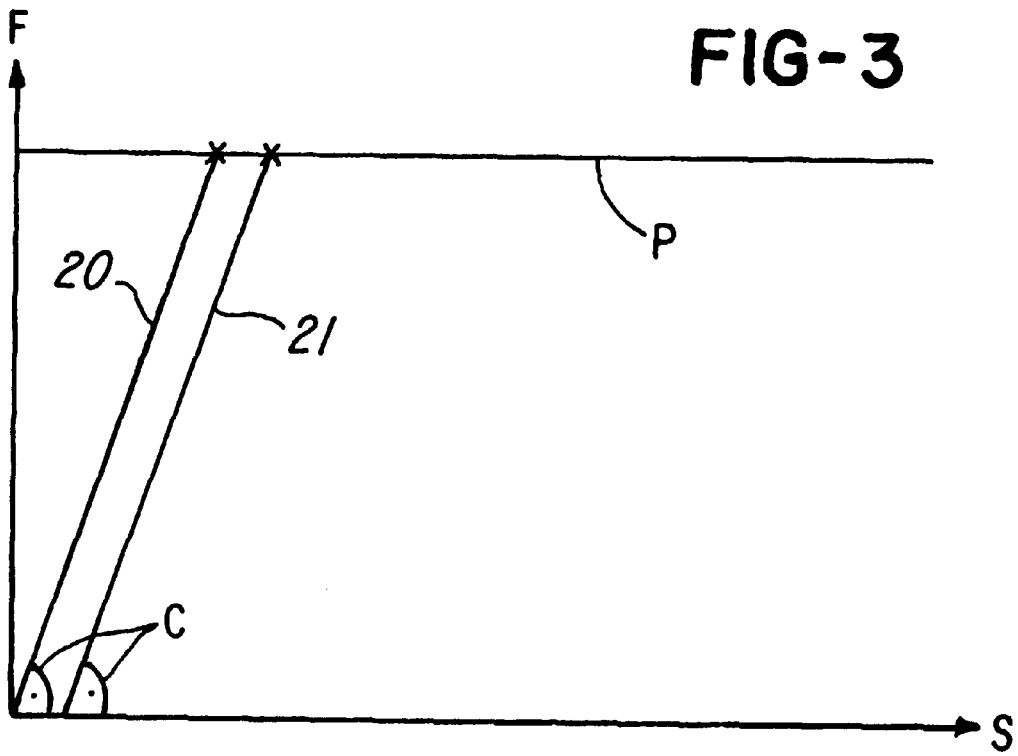
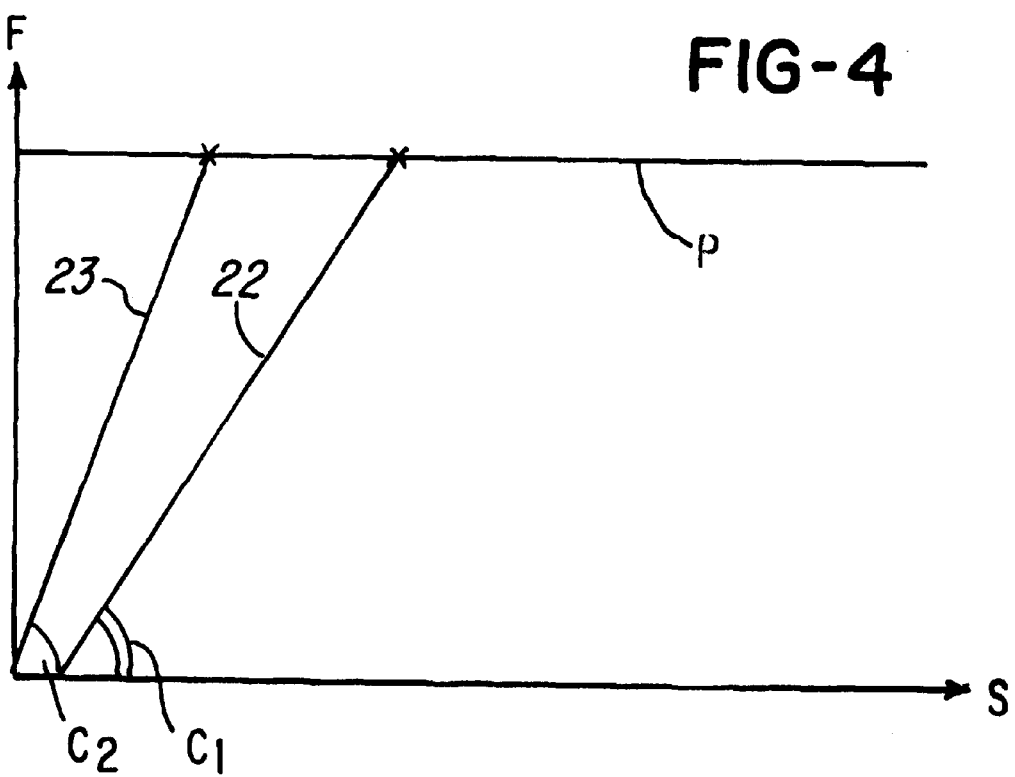

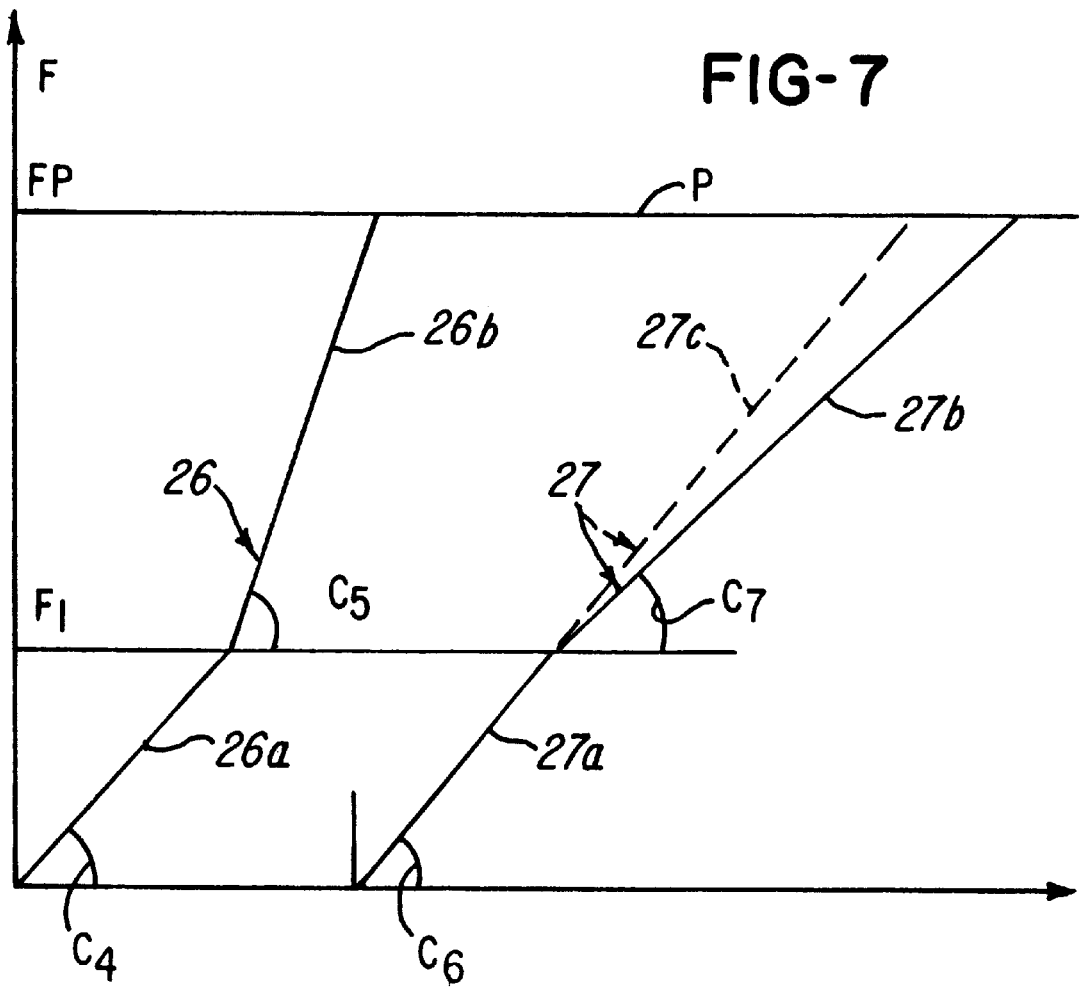

PROCESS AND DEVICE FOR CHECKING THE SOLIDITY OF VERTICALLY ANCHORED MASTS

BACKGROUND OF THE INVENTION

The invention proceeds from a method and a device for checking the solidity of vertically anchored masts according to the introductory parts of patent claims 1 and 7.

Such a method and device for this are known from DE-U-94 04 664 and from EP-A-0 638 704. The means comprises a force unit which introduces a force, continuously measured via a force sensor into the mast above its ground anchoring a distance sensor which continuously measures the mast deflection associated with the introduced force, and an evaluation unit to which both reading types are continuously supplied. The force unit introduces a compression or tensile force as a test load into the mast up to a predetermined value, wherein the previously mentioned readings in the evaluation unit are set to a relationship, wherein the force is represented in dependency on the mast deflection. If up to the test load there results a straight line the mast including its anchoring is to be deemed to be in order. If it results that the straight line before achieving the test load blends into a curved line with a decreasing gradient, a plastic deformation of the mast is present with the result that the mast must the exchanged.

The method and the device have been proven in practise since with this in a simple and fast manner it is possible to determine the stability and bending resistance of the mast. The bending resistance of the mast is however also determined in whether the mast in the course of time has obtained fine fractures or cracks which would compromise its working life.

BRIEF SUMMARY OF THE INVENTION

It is the object of the invention to further develop a method and a device of the previously mentioned type such that there may be achieved an indication on the absence of fracture or cracks or the degree of fracturing or cracking of the mast.

In one aspect, this invention provides a solution comprising a method for checking the solidity of vertically anchored masts according to which increasing tensile and compression forces F are introduced into the mast above its anchoring, these being able to be acquired with a force sensor, in order to load the mast with bending moments aligned oppositely to one another, wherein with at least one distance sensor which can be brought to bear against the mast above the mast anchoring, a lateral deflection S of the mast which occurs on amount of the bending moments is measured and wherein the readings for the force F and the deflection S produced by the force and distance sensors are simultaneously or almost simultaneously processed in an evaluation unit with respect to the functions f=F(S) and f–S(F), this being separately according to the courses of the functions f1 for the compression loading case and f2 for the tensile loading case, wherein a deviation of the gradient of the course of the function f1 from the gradient of the course of the function f2 or from the respective references values, which is determined with the elastic deformation of the mast, is evaluated as a criterion for at least one fracture formation in the mast.

In another aspect, this invention provides a solution comprising a device for checking the solidity of vertically anchored masts with a force unit with which increasing tensile and compression forces f acquirable with a force sensor can be introduced into the mast above its anchoring, in order to load the mast with oppositely directed bending moments, and with at least one distance sensor which can be brought to bear against the mast above the mast anchoring for measuring the lateral deflection S of the mast occurring on account of the bending moments, wherein the readings for the force F and the deflection s' produced by the force and distance sensors re simultaneously or almost simultaneously processable in an evaluation unit with respect to the function f–F(S) or f–S(F), this being separately accordingly to the courses of the functions f1 for the compression loading case and f2 for the tensile loading case, wherein a deviation of the gradient of the course of the function f1 from the gradient of the course of the function f2 or from the respective reference values, which is determined with the elastic deformation of the mast, can be evaluated as a criterion for at least one fracture formation in the mast.

With the solution it is possible to quickly and with little material expense to determine whether a mast has fractures or cracks or not. If the mast e.g. is firstly loaded with a compression force then subsequently in the same vertical testing plane it is loaded with a tensile force. In both cases the force distance values are set into a relationship to one another in the evaluation unit. With this one obtains two straight lines with a certain gradient. With both resulting straight lines particularly the gradients are important features, which are technically compared to reference values. From the straight line with the smaller gradient it results that the mast is burdened with at least one fracture since on account of the fracture it behaves more elastically. According to whether the gradient of the obtained straight line falls short of a predetermined value or not the mast may remain in service or it must be exchanged. In order to make the indication as to the fracture burden of the mast more complete, the bending moment test by way of a compression or tensile force is repeated in at least one other vertical plane which, for example, is at right angles to the first test plane. In this manner the whole extent of the mast to be checked with regard to fracture burden is acquired. The deflection components of the force-distance values may be a distance path as well as an angular distance.

In an advantageous formation of the invention one feature lies in fact that the gradients of the courses of the functions f1 and f2 with respect to the same zero point in dependency on differing points in time may be evaluated as a criterion for an enlargement of fracture and can be documented in the form of a characteristic curve for each mast on a monitor and/or printer connected to the evaluation unit. By way of this with the device according to the invention it is possible for each tested mast with which the force-distance test is repeated in time intervals and the individual results have been docutimented, to determine how its time-dependent characteristic curve obtained in this manner for the testing plane concerned runs. From the course of this testing curve it can then be exactly recognized whether and to apprroximately what measure a fracture determined in an earlier test has enlarged, from which in turn there results an indication to the remaining life of the tested mast. Thus from this it can be read off when the next mast test must he carried out or how long the mast may remain standing without a danger of its failure.

BRIEF DESCRIPTION OF THE DRAWINGS

The invention is hereinafter described in more detail by way of one embodiment example shown in the appended drawings. There are shown.

DETAILED DESCRIPTION OF THE INVENTION

Figure 1:
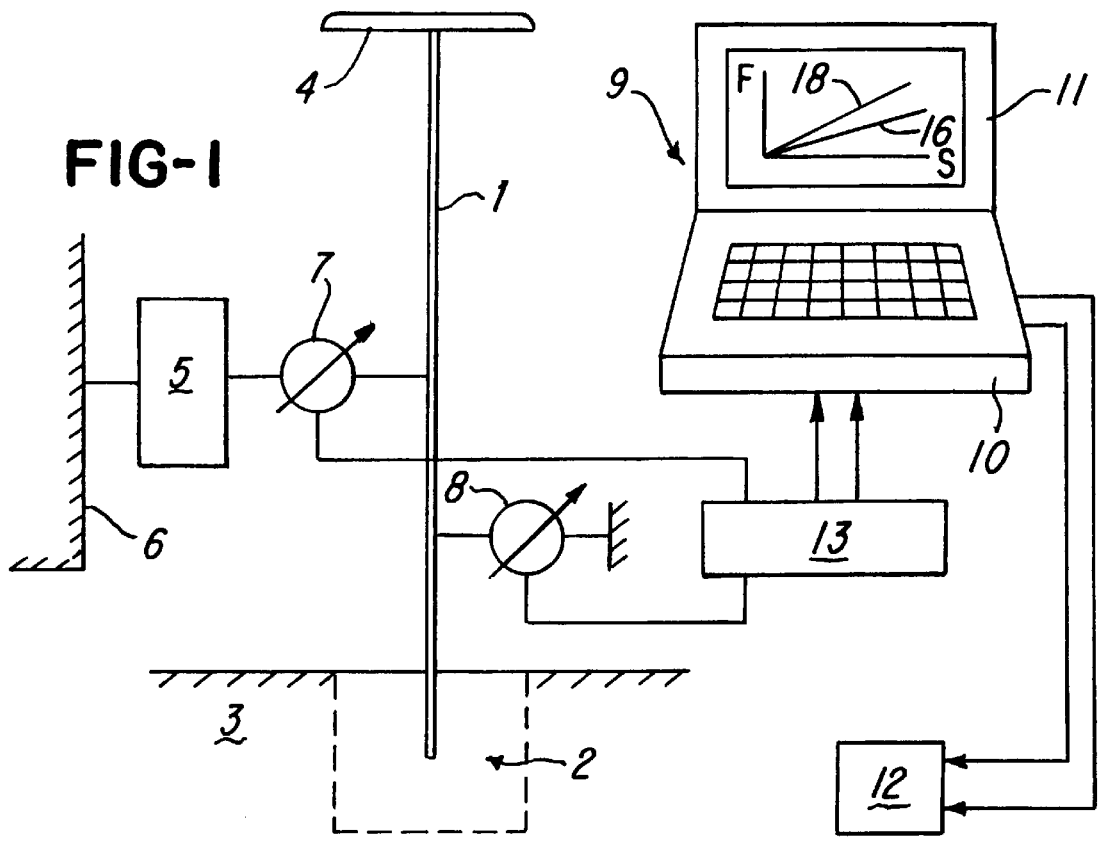
FIG. 1 schematically and heavily simplified the construction of a device according to the invention in combination with a mast to be tested, FIG. 2 a testing procedure on a mast with the device according to FIG. 1, FIGS. 3 and 4 diagrams which show the momentary characteristic curves with a checked mast, FIG. 5 a diagram which shows the the momentary characteristic curves with another checked mast.
Figure 2:
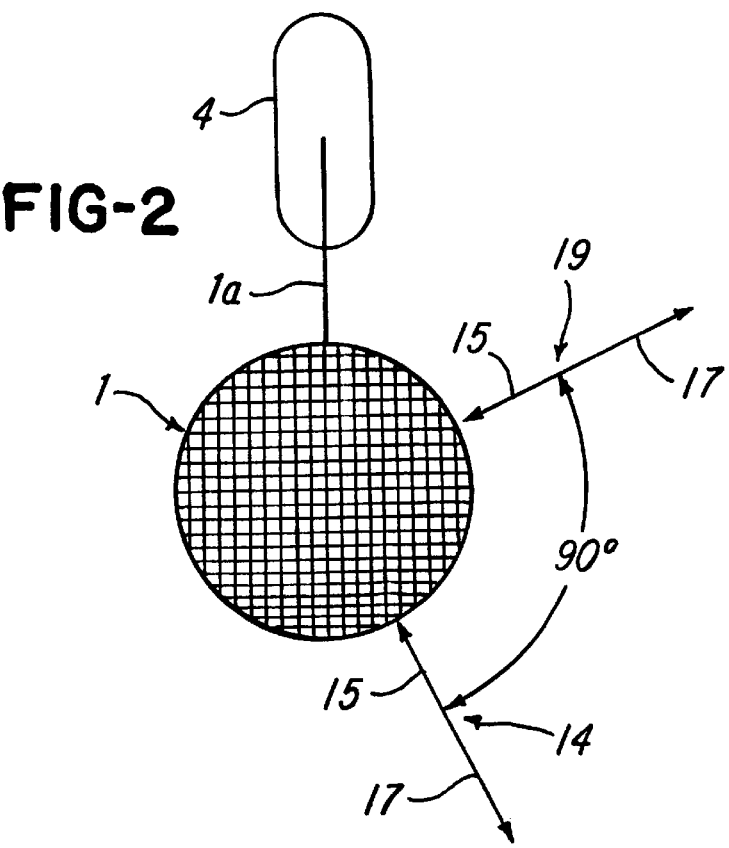

According to the FIGS. 1 and 2 a mast 1 by way of an anchoring 2 is fastened into the ground 3. The mast 1 is for example a light mast, which where appropriate at its upper end comprises an extension arm 1a on whose end a street light 4 is mounted.

A device for checking the solidity of the vertically anchored mast according to FIG. 1 comprises a force unit 5, which for example can be attached to a mobile, schematically indicated vehicle 6, a force sensor 7 which is located between the force unit 5 and the mast 1, a distance sensor 8 preferably formed as a distance extension sensor which is arranged in the same vertical checking plane of the unit 5 and the force sensor 7, but on the other side of the mast 1, as well as an evaluation unit 9 switch connected to the force sensor and distance sensor. This evaluation unit comprises a computer 10, for example, a personal computer which is connected to a monitor 11 and/or a printer 12. Furthermore there is provided a transmitter 13 which in a prepared form transmits the signals of the force sensor 7 and the distance sensor 8 to the computer 10. Features of the device shown in DE U94 04 664, which is incorporated herein by referenced and made a part hereof, may be utilized with features of this invention. It is further possible e.g. to apply two distance sensors 8 whose readings are evaluated so that the evaluated values are used for determining the characteristic curve.

The evaluation unit 9 is formed such that the compression force measuring results as well as the tensile force measuring results in the respective testing plane and in each case with respect to the associated mast deflection are displayed together. The unit 9 may also comprise comparison circuits which are foreseen for reference characteristic curves. Thus the otained momentary characteristic curves are automatically compared to the corresponding reference characteristic curves in the evaluation unit and the results are optically (symbolically or alphabetically) displayed preferably on the monitor and/or the printer. Alternatively or additionally the result may also be acoustically indicated.

The checking of the mast in particular the bending resistance is carried out as follows.

Firstly the vertical testing plane is selected in which the mast 1 by way of a tensile force and a compression force, which engage above the mast anchoring 2 at a predetermined location is loaded with bending. Preferably such a plane is selected in which the main loading of the mast lies. With this preferably the loading of the mast by wind forces is taken into account.

In FIG. 2 with the reference numeral 14 the first vertical resting plane is indicated, in which also the main loading forces of the anchored mast act. It is to be assumed that firstly a compression force 15 is continuously exerted on the mast. The distance sensor 8 which is connected to the mast 1 at a predetermined location above the anchoring in this example acquires the lateral distance path deflections S (along the line 1a in FIG. 2)accompanying the corresponding force F. With this both values are simultaneously or almost simultaneously and continuously inputted into the transmitter 13 which in turn inputs them to the computer 10 suitably prepared. This computer, according to a program processes the incoming readings, i.e. it sets them into a relationship and specifically as a rule as a function f of the force F in dependency on the mast deflection S. With this there arises a momentary characteristic curve 16 (FIG. 1) as can be seen on the monitor 11. Alternatively or additionally this characteristic curve 16 may also be printed with the printer 12 connected to the computer 12 and thus documented.

Subsequently in the same vertical testing plane 14 a tensile force 17 is continuously exerted on the mast 1. Corresponding to the previous explanation in turn a momentary characteristic curve 18 (FIG. 2) is obtained as the graphics on the monitor 11 show. This characteristic curve may comprise the same gradient as the previously obtained characteristic curve 16, it may however also deviate from this, as is represented. Also this characteristic curve may be printed on the printer 12.

The values of both characteristic curves 16, 18 are automatically compared to one another or to the reference values of the comparison switch circuits and the respective result displayed.

The mast 1 is then tested in at least a second testing plane 19 as previously described. This second testing plane runs preferably at right angles to the first vertical testing plane 14. Again two momentary characteristic curves 18 are obtained which are shown on the monitor 11 and/or are permanently documented with the printer 12. If the mast is examined in both testing planes 14 and 19 there is obtained a very good indication with respect to the whole scope of the mast with respect to possible fracture burdening.

The characteristic curves of the diagrams in the subsequently described FIGS. 3 to 7 represent the measuring results automatically evaluated by the evaluation unit 10. For the sake of simplicity the characteristic curves of these figures represent the results only of one of the vertical testing planes. In the same sense they of course also apply to other vertical testing planes.

It is to be assumed that the first mast is subjected to a bending load with a compression force. One obtains according to FIG. 3 for example a momentary characteristic curve 20 as a straight line, and specifically this line runs in a straight shape until reaching a testing load P. Subsequently the mast is subjected to a bending load with a tensile force and whereupon one obtains a further momentary characteristic curve 21. Also this characteristic curve runs straight until the testing load P. In FIG. 3 the two characteristic curves 20 and 21 only for clarity are represented next to one another, indeed they procede from the same zero point and in the present case they cover one another.

Both characteristic curves 20 and 21 comprise over their whole length the same gradient C. These characteristic curves are compared to reference charatcristic curves of the mast by way of comparison circuits, these reference curves corresponding to a fully intact mast. In the present case according to FIG. 3 it is assumed that reference curves which are stored in the program of the computer 10 and are displayed on the monitor correspond to the characteristic curves 20 and 21 obtained by the test, with respect to their gradient and their course. From this it results that the tested mast is in order and thus does not comprise a fracture. Since both characteristic curves here have the same course a comparison with reference characteristic curves is not absolutely necessary.

FIG. 4 shows a testing result of a different mast (it may of course also be the test result of the first mast in a second testing plane). It can be seen that the momentary tensile force characteristic curve 22 has a smaller gradient C1 than the momentary compression force characteristic curve 23 which has a larger gradient C2. It is assumed that the gradient and the course of the characteristic curve corresponds to the corresponding reference characteristic curve so that the tested mast at this point is in order and at least does not have a fracture on the side on which the compression force was exerted.

From the characteristic curve 22 with the smaller gradient C1 there results in comparison to the characteristic curve 23 a fracture in the mast since the mast as previously mentioned behaves more elastically when a fracture is present. This fracture is located at that circumferential location of the mast which lies opposite the force unit 5 from which the tensile force load proceeded. Since the momentary characteristic curve 22 up to the test load P runs straight and still has a relatively large gradient it may he assumed that the tested mast may still remain in operation for a certain time or only needs to be exchanged at a later point in time. This later exchange may be made in accordance with temporal experience values.

It can thus be recognized from the divergence of tile straight lined courses, related to the same zero point, of the mentioned momentary characteristic curves or of the functions f1 and f2 made on the basis of these, where appropriate in combination with the reference characteristic curves, that this divergence can be evaluated in the evaluation unit as a criterion for the fracture or crack formation in the mast.

Figure 5:
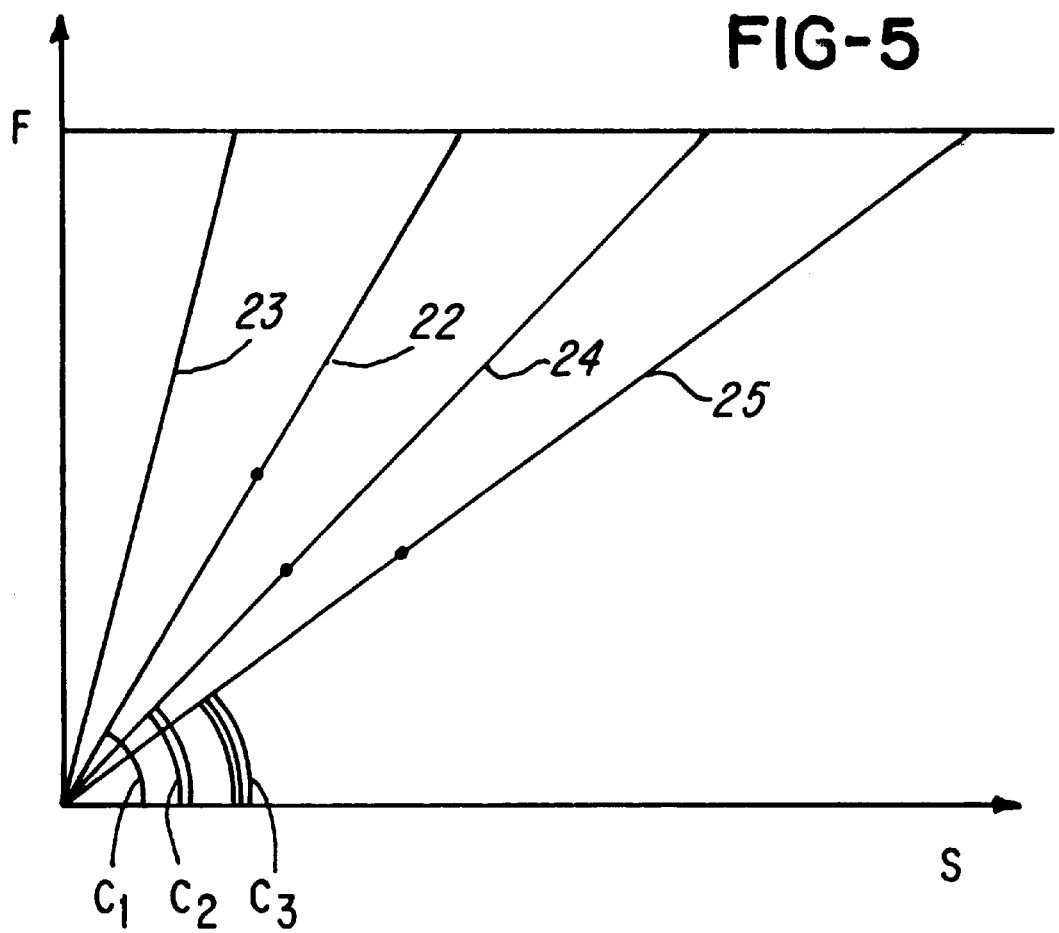
Figure 6:
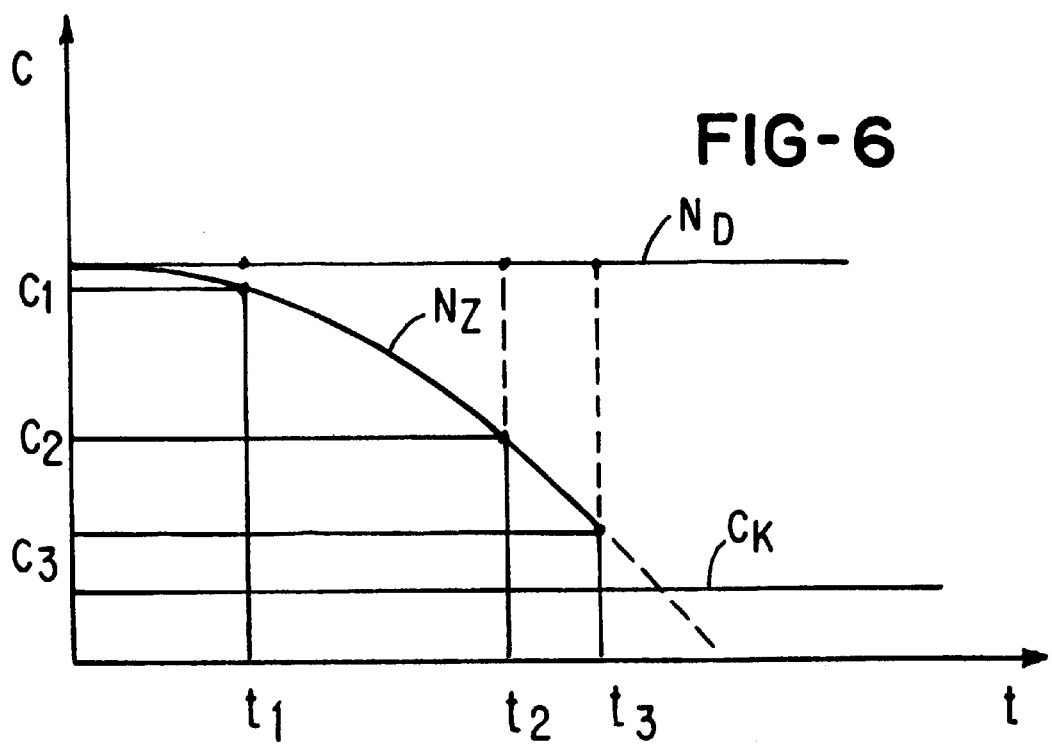
FIG. 6 a diagram which shows a time-dependent characteristic curve which has been obtained from the test results of the momentary characteristic curves according to FIG. 5, and FIG. 7 a further diagram with which bent mast test characteristic curves have been obtained.

In order to be able to exactly predict the time of the necessary exchanging of the mast on account of fracture, the knowledge of the tendency of the temporal course of the respective gradient characteristic curve of a tested mast is advantageous. For this the obtained diagrams according to FIGS. 5 and 6 give reliable information. It is assumed that the tested other mast according to FIG. 4 is tested at further time intervals, wherein in turn reference is made to the test results of only one vertical testing plane.

In FIG. 5 already the momentary characteristic curves 22 and 23 (cf. FIG. 4) from the first test (compression and tensile) are represented. After a certain time for example a year the next compression-tensile test is carried out. After this time one obtains according to FIG. 5 a compression characteristic curve which covers the corresponding characteristic curve 23. At the corresponding location the mast according to final evaluation signal is in order. With the corresponding tensile load in the same testing plane there however results a momentary tensile characteristic curve 24 which deviates from the corresponding characteristic curve 22 obtained with the first test, thus has a smaller gradient C2. The evaluation signal results that the present fracture or crack at the corresponding location has enlarged. After a further time $t_3$ for example half a year after the second test in the same test plane at the same locations of the same mast a third test is carried out. Again according to the example according to FIG. 5 the obtained compression force characteristic curve again covers the original characteristic curve with the conclusion that the mast on its corresponding side is still without a fracture. However one obtains yet a further tensile force characteristic curve 25 whose gradient C3 is even smaller than the gradient of the corresponding characteristic curve 24 of the second test from which it follows that the already previously determined fracture has become even larger. Already from the evaluation signals of these new characteristic curves in a direct comparison an extremely exact prediction of the remaining life cycle of the tested mast is possible.

The evaluation unit 9 or the computer 10 may be formed such that from the obtained different gradients of the corresponding characteristic curves according to FIG. 5 a time-dependent characteristic curve for the change in the gradient of the respective characteristic curve can be computed. For example in FIG. 6 a time-dependent characteristic curve N is represented which represents the temporal course of the gradients based on the changes in the tensile force characteristic curves 22 24 and 25. One recognizes that the lower end of the gradient change characteristic curve $N_Z$ is located very close to a critical value $C_K$. From this there is formed an indicator signal by way of a circuit that the mast is to be shortly exchanged. Thus by way of the characteristic curve $N_2$ according to FIG. 6 a very exact indication on the point of time of exchange of the tested mast can be achieved. Apart from the characteristic curves 22, 23, 24 and 25 which can be displayed on the monitor 11 connected to the evaluation unit 11 and/or documented by the printer 12, also the gradient change characteristic Curve $N_2$ according to FIG. 6 can be shown on the monitor and/or can be documented with the printer.

The horizontal characteristic curve $N_D$ in FIG. 6 also shows optically that with the compression force tests no fracture in the mast could be ascertained.

In FIG. 7 yet a further mast test is represented. In the selected vertical plane with a compression force loading there results a characteristic curve 26 which is composed of at least the sections 26a and 26b. The first section 26a begins with the gradient C4 and runs straight or essentially straight up to the maximum test force F1. The second section 26b connecting thereto likewise runs straight or essentially straight up to the maximum testing force FP but with respect to the gradient C4 of the first section comprises a steeper gradient C5. In particular the first section may in turn comprise several sections (not shown) which are characterized by changes in gradient which can be evaluated and more detailed indications on the fracture damage of the mast.

With an opposing loading of the mast in the same test plane, i.e. with the application of a tensile force loading, there results a characteristic curve 27 which likewise may comprise at least two sections 27a and 27b. They may however from the start consist of only one straight or essentially straight line as is led further by way of the dashed line 27c. In the first case the first section 27a begins with its gradient C6 which corresponds or essentially corresponds to the gradient C4 of the section 26a until roughly the force F1 to which there connects the second section 27b with a gradient C7 which is smaller than the initial gradient C6. In particular the second section may in turn consist of several sections (not shown) which are characterized by changes in gradient which can be evaluated and permit further indications on the fracture damage of the mast.

In the present case there results the considerable deviation of the two characteristic curves from one another in the upper section thereof. Here it is the case of a fracture damage to the mast with the particularity that the fracture is slightly open before the application of the compression force, i.e. the fracture surfaces lying opposite one another do not bear on one another. If the compression force loading is effected on the fracture, i.e. the fracture is located in the compression loading zone of the mast, then the fracture is compresses together, i.e. it closes. Thus along the section 26a the mast behaves more elastically than a mast without a fracture and accordingly firstly the smaller gradient is ascertained. If the fracture surfaces then bear against one another the mast then behaves as a mast without a fracture and there results the second characteristic curve section 26b with a steeper gradient C5.

If then the tensile force loading is effected on the fracture or crack, i.e. the fracture or crack is opened further and the mast in the testing at the beginning likewise behaves more elastically than a mast without a fracture or crack. With this the gradient C6 of the first section 27a may correspond to the gradient C4 of the comparison section 26a as is shown, but it may also be smaller than this. Essentially dependent on the fracture configuration, the tensile characteristic curve 27 may run in a straight manner to the maximum test force FP without a change in gradient, as is shown dashed at 27c, or it may bend approximately from the force value F1 in a manner such that the gradient C7 of the straight or essentially straight section 27b is smaller than the initial gradient C6.

Also in the example according to FIG. 7 thus a course of the two determined loading characteristic curves 26 and 27 which deviate at least partly from one another suggests a fracture damage to the mast. In FIG. 7 the two characteristic curves 26, 27 are drawn displaced to one another only for a clearer picture and a better understanding; they both begin during their evaluation of course at the zero point of the force-distance diagram.

The evaluation unit 9 is installed such that the straight characteristic curves 20 to 27 as well as the gradient change characteristic curves $N_z$ from the readings obtained by the sensors 7 and 8 can be indirectly or directly computed. In any case always a compression force characteristic curve as well a tensile force characteristic curve is evaluated and is represented in a suitable manner so that in comparison to one another or with predetermined reference values it may be determined whether the checked mast is burdened with at least one fracture or not.

With the previously mentioned explanation of the device put forward it is only the case of taking those characteristic curves into account with whose evaluation the respective test load is reached in each case. If the test load is not reached the failure of the mast does not necessarily lead back to a fracture in the mast, but, for example, to a failure of the anchoring in the ground. Further it must once again be stressed that the mast deflection may also be determined by way of angular sensors and suitably processed in the evaluation unit 9.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

We claim:

1. A method for checking the solidity of a vertically anchored mast comprising the steps of:

using a force sensor to measure tensile and compression forces F after introducing increasing tensile and compression forces F into the mast above its anchoring in order to load the mast with bending moments aligned oppositely to one another, bearing at least one distance sensor against the mast above the mast anchoring to measure a lateral deflection S of the mast and wherein readings for said force F and a deflection S are measured by said force sensor and at least one distance sensor, respectively; and using an evaluation unit to process said force F and deflection S measurements using the functions f=F(S) and f=S(F), according to a course of function f1 for a compression load and a course of function f2 for a tensile load, wherein a deviation of a gradient of said course of function f1 from either a gradient of said course of the function f2 or from a reference value is determined using an elastic deformation of the mast is evaluated as a criterion for at least one fracture formation in the mast.

2. The method according to claim 1, wherein a divergence of said courses of said functions f1 and f2, with respect to the zero point is evaluated as a criterion for a fracture formation.

3. The method according to claim 1 wherein the functions f1 and f2 are displayed together on a monitor connected to the evaluation unit.

4. The method according to claim 1 wherein said functions f1 and f2 are drawn with a printer connected to the evaluation unit.

5. The method according to claim 1 wherein said method further comprises the step of evaluating as a criterion for a fracture enlargement the gradients of the courses of the functions f1 and f2 which relate to the same zero point in dependence on differing points in time are evaluated as a criterion for a fracture enlargement.

6. The method according to claim 5 wherein the computed time-dependent gradients of the courses of the functions f1 and f2 in the form of a characteristic curve are displayed on a monitor connected to the evaluation unit.

7. A device for checking the solidity of a vertically anchored mast, comprising:

a force unit comprising a force sensor for situating above a mast anchoring;

at least one distance sensor for situating against the mast above the mast anchoring for measuring a lateral deflection S of the mast occurring on account of said bending moments;

readings for the force F and the deflection S produced by the force and distance sensors are separately processable in an evaluation unit with respect to the function f=F(S) or f=S(F), to provide a deviation from either a gradient of a course of the function f1 from a gradient of a course of the function f2 or from a respective reference value, which is determined with the elastic deformation of the mast, is evaluated as a criterion for at least one fracture formation in the mast.

8. The device according to claim 7 wherein a divergence of said courses of the functions f1 and f2 with respect to a zero point is evaluated as a criterion for a fracture formation.

9. The device according to claim 7 wherein the functions f1 and f2 are displayed together on a monitor connected to the evaluation unit.

10. The device according to claim 7 wherein the functions f1 and f2 are printed with a printer connected to the evaluation unit.

11. The device according to claim 7 wherein said evaluation unit evaluates any gradients of the courses of the functions f1 and f2 which relate to the same zero point in dependence on differing points in time as a criterion for a fracture enlargement.

12. The device according the claim 11 wherein the computed time-dependent gradients of the courses of the functions f1 and f2 in the form of a characteristic curve is displayed on a monitor connected to the evaluation unit.

13. The method according to claim 5 wherein the computed time-dependent gradients of the courses of the functions f1 and f2 in the form of a characteristic curve are printed with a printer.

14. The device according to claim 11 wherein the computed time-dependent gradients of the courses of the functions f1 and f2 in the form of a characteristic curve is printed with a printer.

* * * * *